United States Patent [19]

Biggs et al.

[11] 3,737,653
[45] June 5, 1973

[54] AUTOMOTIVE HEADLIGHT

[75] Inventors: Orrick Howard Biggs, Beverly; Horace H. Homer, Arlington; Frederick A. Lougheridge, Manchester; Arnold Westlund, Jr., Gloucester, all of Mass.

[73] Assignee: Sylvania Electric Products Inc., Danvers, Mass.

[22] Filed: Feb. 14, 1972

[21] Appl. No.: 226,349

Related U.S. Application Data

[63] Continuation of Ser. No. 787,481, Dec. 27, 1968, abandoned.

[52] U.S. Cl..........240/41.3, 240/41.35 R, 240/46.59
[51] Int. Cl...............................................F21v 13/04
[58] Field of Search.....................240/41, 41.3, 41.4, 240/46.01, 46.51, 46.59, 41.35

[56] References Cited

UNITED STATES PATENTS

| 2,338,901 | 1/1944 | Chiti | 240/41.3 |
| 2,195,392 | 3/1940 | Alphen | 240/41.3 |
| 1,626,615 | 5/1927 | Kirby et al. | 240/41.3 |

Primary Examiner—Samuel S. Matthews
Assistant Examiner—Richard M. Sheer
Attorney—Laurence Burns

[57] ABSTRACT

An automotive headlight or the like having a beam controlled by an opaque plate having therein an aperture is provided with a plate having a diffusing surface spaced forwardly somewhat from the opaque plate to reduce or remove the blue color which appears without the plate. The diffuse surface also smooths out the beam at its edges.

4 Claims, 3 Drawing Figures

PATENTED JUN 5 1973         3,737,653
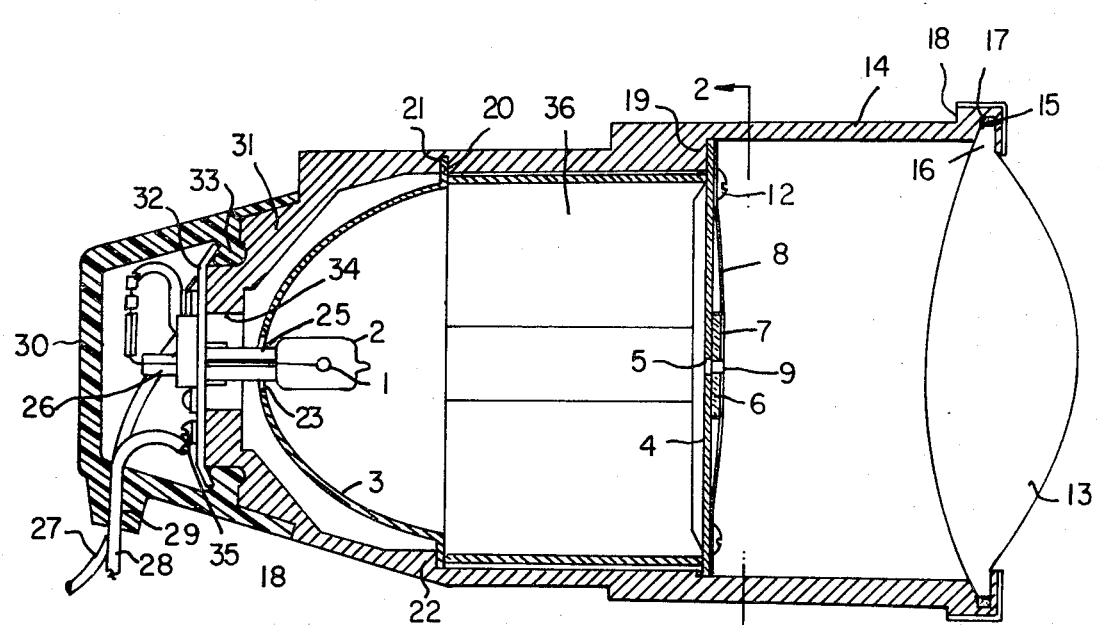
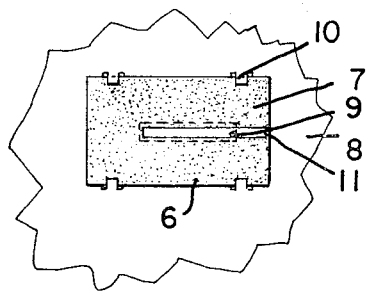
FIG.3
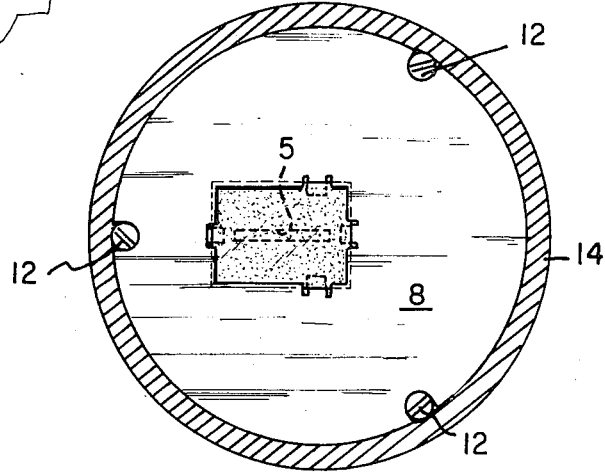
FIG.2
ORRICK HOWARD BIGGS
HORACE H. HOMER
FREDERICK A. LOUGHRIDGE
ARNOLD WESTLUND JR.
    INVENTORS
BY Lawrence Brown,
        ATTORNEY

AUTOMOTIVE HEADLIGHT

This is a continuation, of application Ser. No. 787,481, filed Dec. 27, 1968, and now abandoned.

This invention relates to lights of a type which can be used on motor vehicles for illuminating a roadway, although the lights can also be used for other purposes. In particular they are designed to throw a sharply-defined beam onto the roadway, with negligible upward light, and this can be accomplished by a high intensity light source set near one focus of an ellipse with an aperture called a "gate" near the other focus, the illuminated aperture being focussed onto the road by a lens. Other optical systems of a projection type can be used.

Such lighting is very effective, but the sharpness of the outline of the aperture appears to accentuate the chromatic aberration in the lens so that there is some blue color produced around the perimeter of the beam. This is found to be undesirable in many cases, and may result in an ordinary car's being mistaken for a police car, which causes confusion.

Various solutions have been proposed, but have involved critical adjustments which would be awkward and very expensive to make in production, as well as susceptible to being put out of alignment by severe road shocks in driving the vehicle.

We have found that a very effective means of greatly reducing or eliminating the blue color without critical positioning is the placing of a thin piece of frosted glass just in front of the gate, and spaced slightly from it. This smooths out the edges of the beam and reduces the blue color, because the limited diffusion of the beam by the frosted glass insures that light will be incident on the rim portions of the lens at a variety of angles, so that the light of a particular color is not confined to a particular angle but mixed at all angles with other light of a different color. The blue color can be made to disappear and be replaced by white. This smoothing out also makes the beam cut-off at its perimeter just slightly less sharp, which is also advantageous.

If desired, the middle of the glass can be made clear, that is unfrosted, with the frosting confined to the edges, or the middle portion can be frosted less heavily, but this brings back some of the criticality in positioning that is generally undesirable. On the other hand, it increases the beam candlepower, by leaving the light at the center of the lens undiffused.

The degree of frost on the glass is quite important. Too little will fail to reduce the amount of blue color sufficiently, and too much will reduce the sharpness of the beam and cause loss of light in the center.

These and other objects, features and advantages of the invention will be apparent from the following specification in which:

FIG. 1 is a longitudinal section of one embodiment of a headlamp according to the invention;

FIG. 2 is a transverse cross-section on line 1—1;

FIG. 3 is a transverse view of the other side of the disk in the preceding figure, showing also an alternative form of diffusing plate.

In FIG. 1, the coiled filament 1 in lamp bulb 2 is at or near the first focus of ellipsoidal reflector 3, and the apertured, opaque disk or plate 4, often called a "gate" is set with the aperture or opening 5 at or near the second focus of the ellipsoid. The glass diffusion plate 6 is held in front of and in register with the aperture 5 and has a frosted surface 7 on its side farthest from the gate 4. The flexible metal disk 8 holds the diffusing plate 6 against the gate 4 and in register with the aperture 5. The disk 8 has an opening 9 through which light from the reflector can pass the plate 6 being held thereto by the tabs 10, preferably one on each side of the plate 6, as shown in FIGS. 2 and 3, the tabs 10 being on the side of the disk 8 nearest gate 4, the pressure of disk 8 against plate 6 forcing the latter into contact with gate 4.

Since the gate 4 is substantially at the second focal point of the ellipsoid, the diffusing frosted surface 7 is out of the focus by at least the thickness of the diffusing plate 6, which in one example was about 0.05 inch. The plate needs to be somewhat out of focus in order to diffuse the light properly.

The diffusing plate 6 can be frosted all over, as shown in FIG. 2, or can have an unfrosted portion 11 in register with, but smaller than, the aperture 5. This diffuses the rays from the edges of the aperture, which normally go to the edges of the lens and produce chromatic aberration, causing a blue color around the edge of the beam.

The surface 7 can be frosted by a sandblast using No. 1 grit sold by S. S. White Co. of New York, N. Y. The maximum frost produced by a sandblast with that size grit is used. This eliminates criticality in frosting, because as long as the blast pressure is sufficient to produce a frost, and the time greater than that needed to produce the maximum frost, the degree of frosting will be correct. Of course, other sizes of grit can be used if for some reason a different degree of frost is desired, and chemical and vapor etches can be used.

For convenience in manufacture, we have made the unfrosted portion extend to the edge of diffusing plate 6 on one side, as shown in FIG. 3. This can be done by placing a mask over the portion to be unfrosted during sandblasting.

The disc 8 can be held to the gate 4 by the screws 12.

A lens 13 is affixed to a housing canister 14 by the cement 15 around its rim 16 which is set into a circumferential groove 17 just inside the end 18 of the canister, which end 18 would be open except for the lens 13. The lens 13 has its rear focus at or near the gate 4, and projects a beam forwardly toward infinity. The housing canister 14 has a step 19 around its inside circumference, in the plane of the gate 4, against which the gate can be set and held. The step 19 can be deeper at the top of the canister 14 than at the bottom.

The ellipsoidal reflector 3 has the flanged rim 20 which sets into an internal groove 21 at the top of the canister 14 and sets against a step 22 at the bottom of said canister. The reflector 3 has the opening 23 at its apex, through which the lamp 2, which carries coiled filament 1, is inserted. The lamp 22 has the pressed seal type of base 25, which fits into a socket 26, from which insulated lead-in wires 27, 28 emerge through openings 29 in a rubber cup, or "boot" 30 held to the closed end 31 of canister 14 by the metal disc 32 which bears against the internal annular ring 33 of boot 30. The disc 32 is held to close the opening 34 in end 31 by screw 35. A metal cylinder 36 spaces the open end of reflector 3 from gate 4.

The constructional details of the canister and boot are shown in U.S. Pat. No. 3,558,872 of Hough and Dayton for an automotive driving light. The lens is described in U.S. Pat. No. 3,598,477 of Robert E. Levin for Automobile Headlights. The lamp 2 is described in U.S. Pat. No. 3,510,718 of John J. Vetere for an Automative Lamp.

Although a specific embodiment of the invention has been described herein, various modifications will be apparent to a person skilled in the art, without departing from the spirit and scope of the invention, which is defined by the claims.

What we claim is:

1. A vehicle light comprising, in combination:

a housing;

an ellipsoidal reflector mounted in said housing;

a light source mounted within said housing substantially at the first focus of said ellipsoidal reflector;

an opaque plate mounted within said housing and having an aperture substantially at the second focus of said ellipsoidal reflector;

a projection lens attached to said housing and having its rear focus substantially at said aperture;

and a light-transmitting plate mounted adjacent to said aperture on the side thereof facing said lens, said light-transmitting plate being parallel to the plane of said aperture, and said light-transmitting plate having a diffusing surface on the side thereof opposite that adjacent to said aperture, said diffusing surface having a clear portion in register with but smaller than the aperture in said opaque plate, said light-transmitting plate being sufficiently thick to dispose said diffusing surface out of the second focus of said ellipsoidal reflector.

2. The combination of claim 1, in which said aperture is rectangular.

3. The combination of claim 1 wherein said light-transmitting plate is of substantially clear glass, and at least a portion of the side thereof opposite that adjacent to said aperture is frosted to provide light diffusion.

4. The combination of claim 3, in which the glass plate is about 0.05 inch thick.

* * * * *

UNITED STATES PATENT OFFICE
CERTIFICATE OF CORRECTION

Patent No. 3,737,653   Dated June 5, 1973

Inventor(s) ORRICK HOWARD BIGGS, HORACE H. HOMER, FREDERICK A. LOUGHRIDGE, ARNOLD WESTLUND, JR.

It is certified that error appears in the above-identified patent and that said Letters Patent are hereby corrected as shown below:

Cover sheet, under "Inventors", change "Lougheridge" to ---Loughridge---

Signed and sealed this 27th day of November 1973.

(SEAL)
Attest:

EDWARD M. FLETCHER, JR.         RENE D. TEGTMEYER
Attesting Officer                Acting Commissioner of Patents